J. MARR.
Plows.

No. 141,881.  Patented August 19, 1873.

Witnesses.
J. R. Drake.
C. D. Swan.

James Marr.
Inventor, By
Burke, Fraser & Co.
Attys.

UNITED STATES PATENT OFFICE.

JAMES MARR, OF SIMCOE, CANADA.

IMPROVEMENT IN PLOWS.

Specification forming part of Letters Patent No. 141,881, dated August 19, 1873; application filed March 14, 1873.

*To all whom it may concern:*

Be it known that I, JAMES MARR, of Simcoe, in the county of Norfolk, Province of Ontario and Dominion of Canada, have invented certain new and useful Improvements in Plows, of which the following is a specification:

This invention relates to certain improvements in self-holding plows, which are provided with a balance-wheel at the rear and a wheel at the front, by which means furrows of the same width are at all times cut; and it consists in mounting the balance-wheel on a crank-axle hung in an arbor or bracket, so that the same may be removed with ease when desired, and combining therewith a rack for holding the balance-wheel against the ground when in use; and it further consists in attaching the gage-wheel to a vertical bar connected to a slotted arm, so that the width of the furrow may be regulated, as will hereinafter appear.

Figure 1:
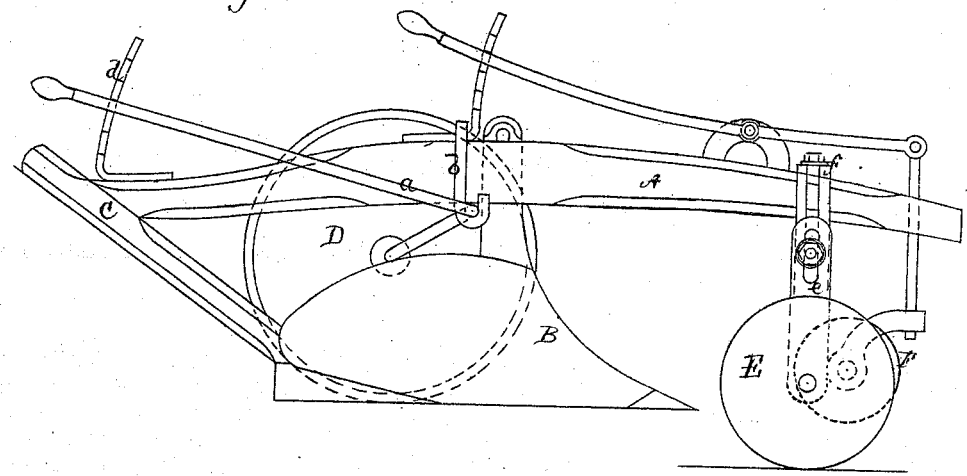
Figure 2:
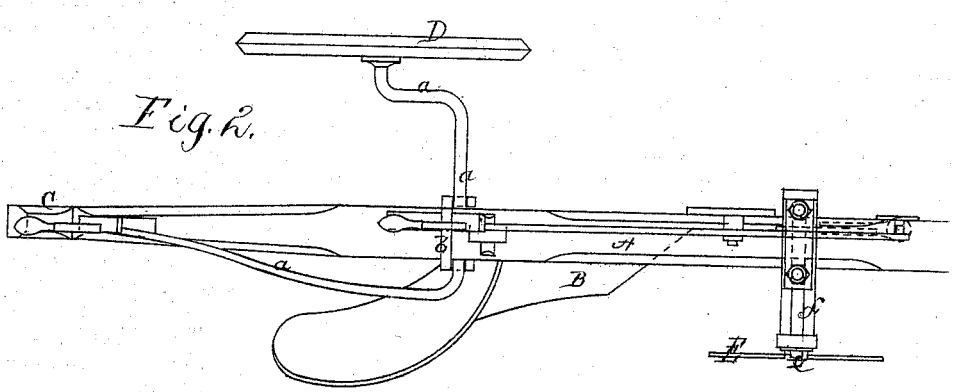

In the drawings, Figure 1 is a side elevation. Fig. 2 is a plan.

A is the beam; B, the mold-board and share; and C, the back post or stay. D is the large balance-wheel, whose tire or periphery is made beveled or V-shaped, the object to be presently explained. This wheel is attached to or moves on a crank-shaped axle, $a$, which passes underneath the beam just back of the mold-board, and is secured thereto by a strap or hanger, $b$, in which it works. This axle $a$ is then bent back, and passes to the rear in the form of a lever-handle, and engages in the notches or teeth in an upright catch or rack, $d$, fastened to the top or side of the beam. By the peculiar form of this combined lever and axle—raising its lever end and setting it in the catch—the wheel D is raised or lowered to accommodate it to any inclination or inequality of the ground to be plowed over.

The manner of attachment of the lever-axle to the beam is important, as by the use of the strap or hanger $b$ it can easily be fastened on or unshipped by merely sliding on or back the hanger $b$, which is a great advantage. Should the wheel or axle need repairing or taking off, it can be done in a few moments.

E is a thin and sharp gage-wheel working on one side of the beam, and attached to an upright slotted piece, $e$, which in turn is attached to a slotted arm, $f$, fastened to the beam at right angles thereto, for setting the wheel higher or lower. This wheel is for the purpose of guiding and holding the plow, and when one furrow has been cut it runs in said furrow close up to the edge of the land. By this means furrows of equal width may be turned at all times. The wheel may be adjusted nearer to or farther from the beam to regulate the width of furrow.

I claim—

1. The combined axle and lever $a$, constructed in one piece, bent and arranged as described, and attached to the beam A by the hanger $b$, in combination with the wheel D and rack $d$, as hereinbefore specified.

2. In a self-holding plow, the upright $e$, carrying the holding-wheel E and attached to the slotted arm $f$, substantially as and for the purpose described.

In witness whereof I have hereunto signed my name in the presence of two subscribing witnesses.

JAMES MARR.

Witnesses:
 J. R. DRAKE,
 C. N. WOODWARD.